United States Patent
McAllester

(10) Patent No.: US 6,968,627 B1
(45) Date of Patent: Nov. 29, 2005

(54) SLOPE DETERMINATION SYSTEM

(76) Inventor: Craig L. McAllester, 6950 W. Laurel La., Peoria, AZ (US) 85345-8744

(*) Notice: Subject to any disclaimer, the term of this patent is extended or adjusted under 35 U.S.C. 154(b) by 2 days.

(21) Appl. No.: 10/731,527

(22) Filed: Dec. 8, 2003

Related U.S. Application Data

(60) Provisional application No. 60/460,373, filed on Apr. 4, 2003, provisional application No. 60/447,063, filed on Feb. 13, 2003, provisional application No. 60/432,303, filed on Dec. 9, 2002.

(51) Int. Cl.[7] ............. G01C 9/12; G01B 3/56
(52) U.S. Cl. ............. 33/397; 33/344; 33/451
(58) Field of Search ............. 33/391, 344, 397, 33/399, 401, 404, 407, 451

(56) References Cited

U.S. PATENT DOCUMENTS 803,287 A * 10/1905 Hodgson ............. 33/368
1,111,706 A * 9/1914 Ritty ............. 33/391
1,313,263 A * 8/1919 Conn ............. 33/399
1,481,716 A * 1/1924 Ketchum ............. 33/391
1,597,960 A * 8/1926 Eltag ............. 33/368
1,664,365 A * 3/1928 Katolin ............. 33/396
1,901,793 A * 3/1933 Allen ............. 33/399
1,919,106 A * 7/1933 Hamernick ............. 33/369
2,654,158 A * 10/1953 Clyde ............. 33/354
2,694,865 A * 11/1954 Le Pera ............. 33/391
2,847,765 A * 8/1958 Bateman ............. 33/391
5,519,942 A * 5/1996 Webb ............. 33/290
5,713,135 A * 2/1998 Acopulos ............. 33/451
5,956,260 A * 9/1999 Heger et al. ............. 33/391

* cited by examiner

*Primary Examiner*—Christopher W. Fulton
(74) *Attorney, Agent, or Firm*—Stoneman Law Offices, Ltd.; Martin L. Stoneman

(57) ABSTRACT

A hand-held system for determining the slope of an element having an irregular surface, such as a shingled roof, or along a surface that is partially obscured by adjacent elements. The system comprises an inclinometer having a double indicator to provide two simultaneous readings of slope.

41 Claims, 11 Drawing Sheets

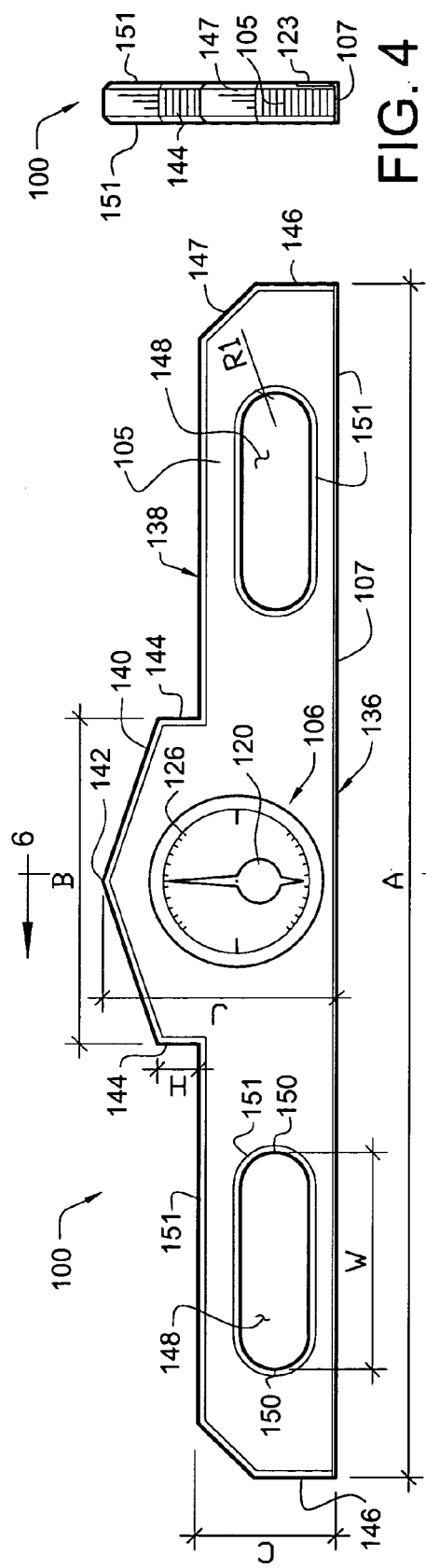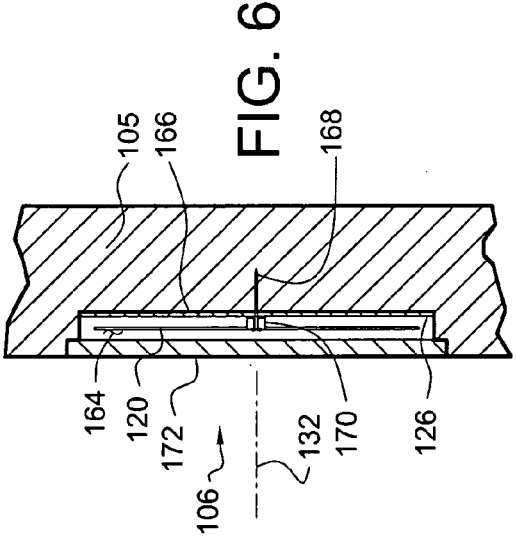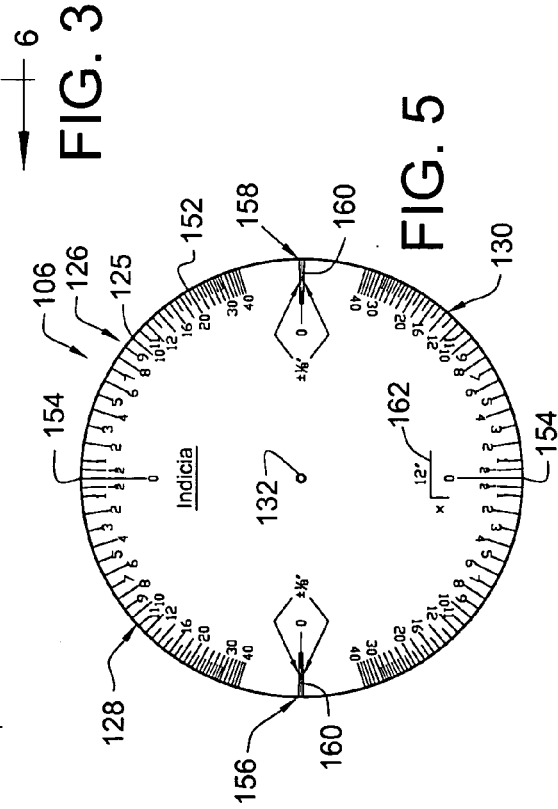

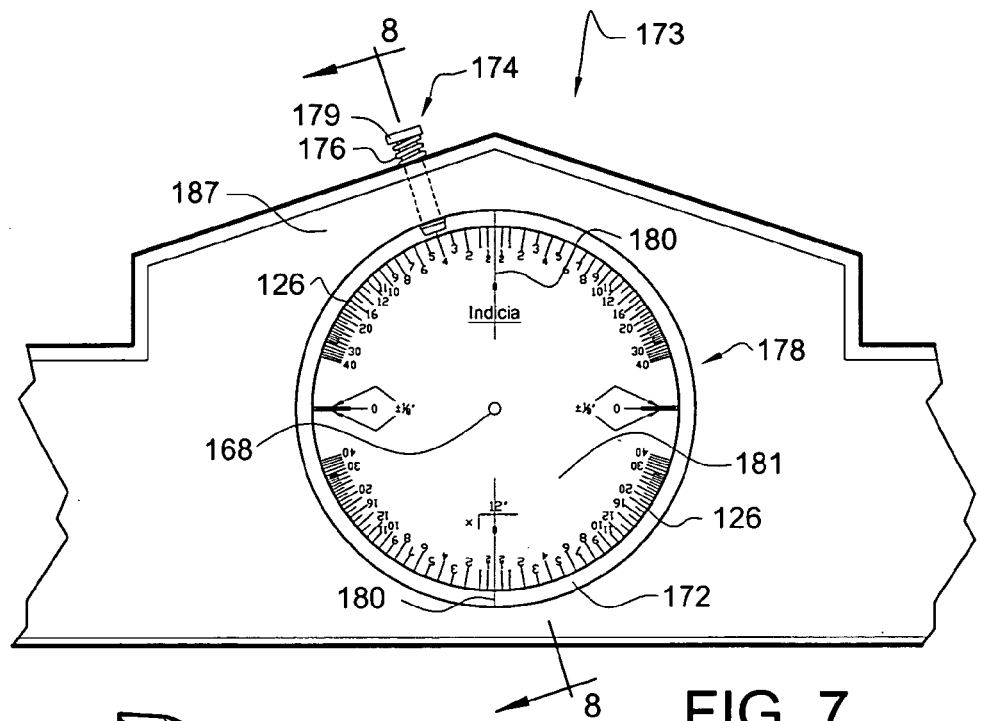

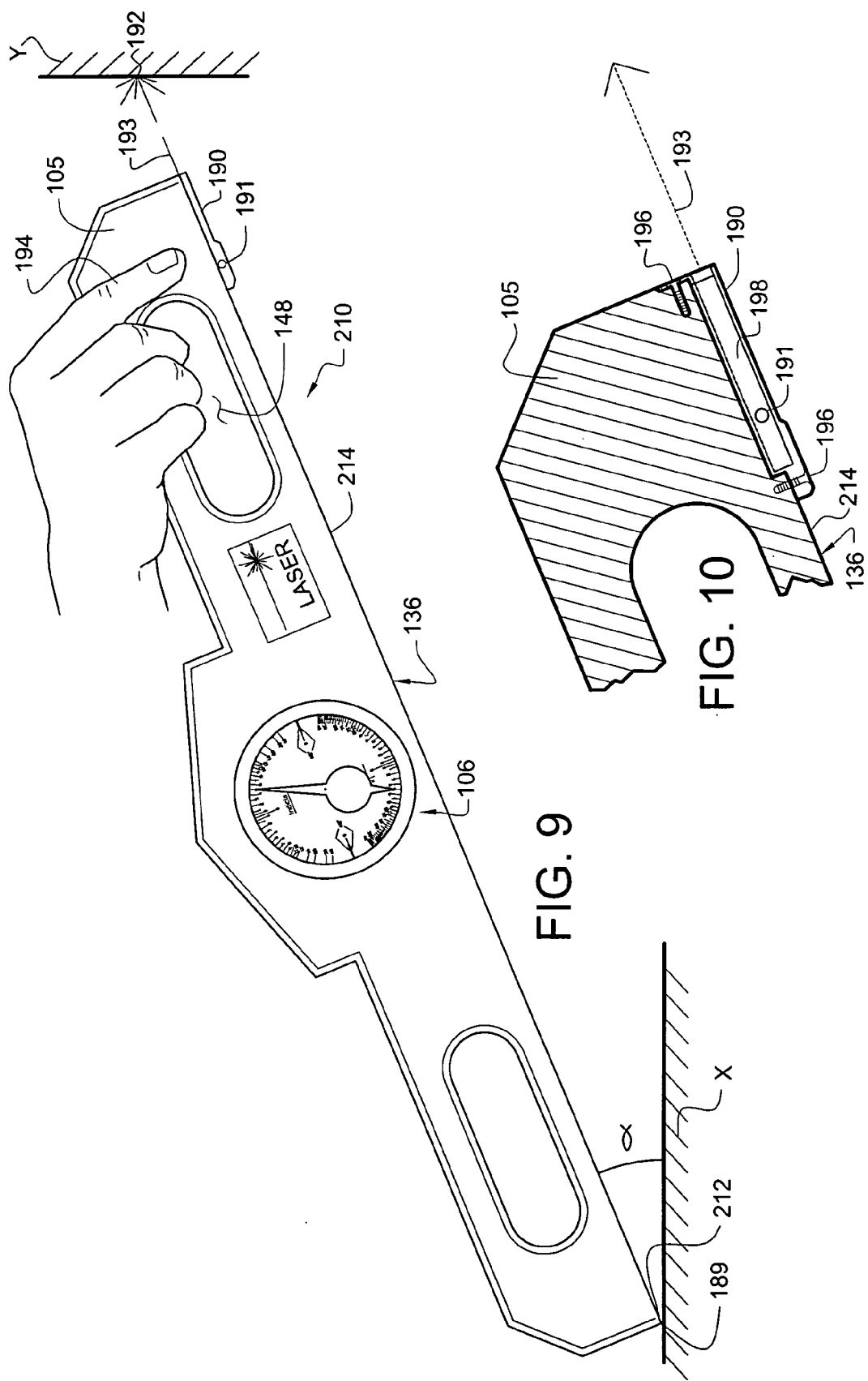

US 6,968,627 B1

SLOPE DETERMINATION SYSTEM

CROSS-REFERENCE TO RELATED APPLICATION

The present application claims priority from prior provisional application Ser. No. 60/432,303, filed Dec. 9, 2002, entitled "A DEVICE FOR MEASURING PITCH OR SLOPE OF A ROOF, SLAB, WALK WAY, PLUMBING LINES, FORMS, OR OTHER SLOPING MEMBERS AS USED IN THE CONSTRUCTION FIELD"; prior provisional application Ser. No. 60/447,063, filed Feb. 13, 2003, entitled "SLOPE DETERMINATION SYSTEM"; and prior provisional application Ser. No. 60/460,373, filed Apr. 4, 2003, entitled "SLOPE DETERMINATION SYSTEM"; the contents of all of which are incorporated herein by this reference and are not admitted to be prior art with respect to the present invention by the mention in this cross-reference section.

BACKGROUND

This invention relates to providing a hand-held system for improved measurement of slope. More specifically, this invention relates to providing a convenient means for measuring the slope of an element having an irregular surface (such as a shingled roof) or along a surface that is partially obscured by adjacent elements (such as in groups of piping).

It is often necessary, in the field of building and construction, to determine the slope of an existing building element or to establish a slope during the installation of new construction components. Tradesmen have historically used several techniques to determine the slopes of building elements.

A common technique, such as to establish the slope of a roof, involves placing one end of a bubble-type level on a first point of the roof surface, setting the level to horizontal, measuring out a set horizontal distance from the first point to a second point, followed by taking a vertical measurement from the second point to a lower third point on the roof surface. This type of slope measurement is commonly referred to as determining the "rise over run" of the roof. In the United States, the "rise over run" is typically recorded as a ratio of measured inches of vertical "rise" over twelve inches of horizontal "run". This type of rise over run determination is both time-consuming and cumbersome, requiring at least two separate measuring devices and a number of sequential measuring steps. Further, the operation must be performed on a sloping, typically elevated roof, putting the safety of the tradesman at risk.

A second method of slope determination involves the use of an inclinometer. Inclinometers typically operate using a pivoting pointer that aligns, by gravity, to a fixed scale, and is accurate within one to two degrees. No known prior hand-held inclinometers have been arranged to display more than one indication of slope or to provide multiple simultaneous viewable readings from a single instrument, and are, therefore, of limited value when attempting to read portions of the inclinometer that are obscured by adjacent building elements (e.g., pipes and/or roof fascia members). Further, no known prior hand-held inclinometers have permitted accurate measurement of slope over an irregular surface, such as a shingled roof surface, without the use of a separate elongated spanning member, such as a rod or board.

To determine zero slope (level) and 90 degree slope (plumb), bubble levels and plumb lines are typically used. No known prior hand-held inclinometers are designed to be used to measure plumb and level.

It would be useful to have a slope measuring system that utilizes a readable scale in multiple positions. It would also be useful to have such a scale that utilizes easier point-marking means, such as a laser-pointer. It would also be useful to have such a scale that is easily replaceable with another scale. It would further be useful to have a slope measuring system that is accurate to one-half of a degree. It would even further be useful to have a slope measuring system that measures plumb and level.

OBJECTS AND FEATURES OF THE INVENTION

A primary object and feature of the present invention is to provide a slope determination system to overcome the above-mentioned problems.

It is a further object and feature of the present invention to provide such a slope determination system that provides multiple, simultaneous, and direct readings of the slope measurement.

It is a further object and feature of the present invention to provide such a slope determination system that displays multiple direct readings of a slope defined by a dimensional rise over a dimensional run.

It is a further object and feature of the present invention to provide such a slope determination system that is substantially unitary in form.

It is a further object and feature of the present invention to provide such a slope determination system that is capable of measuring slope over an irregular surface.

It is a further object and feature of the present invention to provide such a system that is capable of determining slope along a surface that is partially obscured by adjacent elements (such as in groups of piping).

It is a further object and feature of the present invention to provide such a system that is easily gripped by the operator to facilitate ease of use and safety.

It is a further object and feature of the present invention to provide such a system that uses a laser-pointer marking system.

It is a further object and feature of the present invention to provide such a system having scales in any required unit of measure.

It is a further object and feature of the present invention to provide such a system having replaceable scales.

It is a further object and feature of the present invention to provide such a system that is useful to measure plumb and a level.

It is a further object and feature of the present invention to provide such a system that is accurate within one-half of a degree.

A further primary object and feature of the present invention is to provide such a system that is efficient, inexpensive and handy. Other objects and features of this invention will become apparent with reference to the following descriptions.

SUMMARY OF THE INVENTION

In accordance with a preferred embodiment hereof, this invention provides a slope determination system for determining a slope of an element, comprising in combination: calibrated indicia means for providing a calibrated indication of slope; multiple-indicator means for providing at least two simultaneous indications with respect to such calibrated indicia means; gravity-assisted positioner means for maintaining, essentially by gravity, the position of such multiple-indicator means with respect to vertical; abutting means for abutting the element having the slope to be determined; and geometry-control means for controlling the geometry of such calibrated indicia means relative to such abutting means; wherein, by using such abutting means to abut the element, the slope of the element may be determined by observing at least one of the at least two simultaneous indications of such multiple-indicator means.

In accordance with another preferred embodiment hereof, this invention provides a slope determination system for determining a slope of an element, comprising in combination: calibrated indicia to provide a calibrated indication of slope; at least one multiple-indicator to provide at least two simultaneous indications with respect to such calibrated indicia; at least one gravity-assisted positioner to maintain, essentially by gravity, the position of such at least one multiple-indicator with respect to vertical; at least one abutter structured and arranged to abut the element having the slope to be determined; and at least one geometry-controller to control the geometry of such calibrated indicia relative to such at least one abutter; wherein, by using such at least one abutter to abut the element, the slope of the element may be determined by observing at least one of the at least two simultaneous indications of such at least one multiple-indicator.

Moreover, it provides such a slope determination system, wherein: such calibrated indicia comprises at least one first calibrated scale and at least one second calibrated scale; such at least one first calibrated scale and such at least one second calibrated scale are substantially similar in calibration; and such calibrated indicia is structured and arranged such that such first pointer portion provides such at least one indication with respect to such at least one first calibrated scale, and such second pointer portion provides such at least one simultaneous indication with respect to such at least one second calibrated scale.

Additionally, it provides such a slope determination system, wherein such at least one calibrated scale is between about two and about twelve inches in diameter. Also, it provides such a slope determination system, wherein at least a portion of such at least one first calibrated scale is viewable from a position above such slope determination system. In addition, it provides such a slope determination system, wherein such at least one calibrated scale is printed on at least one rigid frame. And, it provides such a slope determination system, wherein such at least one calibrated scale is printed on at least one replaceable dial. Further, it provides such a slope determination system, wherein such at least one calibrated scale is printed on at least one protective cover. Even further, it provides such a slope determination system, wherein such at least one calibrated scale is printed on at least one replaceable protective cover.

Moreover, it provides such a slope determination system, wherein such calibrated indicia designates at least one slope defined by at least one rise over at least one run. Additionally, it provides such a slope determination system, wherein such calibrated indicia designates at least one slope defined by at least one distance of rise over a run of twelve-inches. Also, it provides such a slope determination system, wherein such calibrated indicia designates at least one slope having a run of one-eighth-inch and a rise of twelve-inches. In addition, it provides such a slope determination system, wherein such calibrated indicia designates at least one slope defined by angular degrees. And, it provides such a slope determination system, wherein such calibrated indicia designates at least one slope defined by percent of slope.

Further, it provides such a slope determination system, wherein such calibrated indicia further comprises at least one calibrated scale defining at least one position of verticality. Even further, it provides such a slope determination system, wherein such calibrated indicia further comprises at least one calibrated scale defining at least one position of plumb. Moreover, it provides such a slope determination system, wherein such calibrated indicia further comprises at least one calibrated scale defining at least one position of level.

Additionally, it provides such a slope determination system, wherein: such calibrated indicia comprises at least one first calibrated scale and at least one second calibrated scale; such at least one first calibrated scale and such at least one second calibrated scale are calibrated differently; and such calibrated indicia is structured and arranged such that such first pointer portion provides such at least one indication with respect to such at least one first calibrated scale, and such second pointer portion provides such at least one simultaneous indication with respect to such at least one second calibrated scale.

Also, it provides such a slope determination system, wherein: such at least one substantially rigid frame comprises at least one axle; such at least one multiple-indicator comprises pointer portions comprising first pointer portions and second pointer portions; and such first pointer portions and such second pointer portions are pivotally-mounted to such at least one substantially rigid frame on such at least one axle. In addition, it provides such a slope determination system, wherein: one such first pointer portion and one such second pointer portion are located along a longitudinal axis; and such at least one axle crosses transversely along at least one point along the longitudinal axis. And, it provides such a slope determination system, wherein at least a portion of such at least one first pointer portion is viewable from a position above such slope determination system.

Further, it provides such a slope determination system, wherein: such at least one gravity-assisted positioner comprises at least one weight having a center of gravity; and such at least one weight is coupled to such multiple-pointer such that the center of gravity of such at least one gravity-assisted positioner is not located on such at least one axle.

Even further, it provides such a slope determination system, wherein such at least one gravity-assisted positioner comprises a rotatable gauge mounted in such at least one substantially rigid frame. Moreover, it provides such a slope determination system, wherein such at least one substantially rigid frame comprises a gauge-brake structured and arranged to hold the position of such rotatable gauge by engaging such gauge-brake and release such rotatable gauge by disengaging such gauge-brake.

Additionally, it provides such a slope determination system, wherein such at least one abutter comprises at least one laser pointer.

Also, it provides such a slope determination system, wherein such at least one geometry controller comprises at least one substantially rigid frame. In addition, it provides such a slope determination system, wherein such at least one abutter comprises at least one essentially flat side of such at least one substantially rigid frame. And, it provides such a slope determination system, wherein such at least one abutter further comprises a angled rigid metal bar. Further, it provides such a slope determination system, wherein such at least one abutter has a length of about 24 inches. Even further, it provides such a slope determination system, wherein such at least one abutter comprises at least one laser pointer structured and arranged to visually extend at least one longitudinal axis of such at least one abutter.

Moreover, it provides such a slope determination system, wherein such at least one substantially rigid frame further comprises at least one cavity adapted to contain such at least one multiple-indicator and such at least one viewable display of calibrated indicia. Additionally, it provides such a slope determination system, wherein such at least one substantially rigid frame comprises a material selected from the group consisting of: plastic, wood, and metal.

Also, it provides such a slope determination system, further comprising: at least one protective cover for protectively covering such at least one cavity; wherein such at least one protective cover is substantially transparent. In addition, it provides such a slope determination system, wherein such at least one protective cover comprises at least one first calibrated scale and at least one second calibrated scale. And, it provides such a slope determination system, wherein such at least one protective cover is replaceable by a user. Further, it provides such a slope determination system, wherein such at least one cavity is between about two and about twelve inches in diameter. Even further, it provides such a slope determination system, wherein such at least one substantially rigid frame comprises at least one grip assister adapted to assist a user in gripping such system. Even further, it provides such a slope determination system, wherein: such at least one grip assister comprises at least one aperture through such at least one substantially rigid frame; and such at least one aperture is adapted to pass at least one portion of a hand of the user. Even further, it provides such a slope determination system, wherein such at least one substantially rigid frame is about 24 inches long. Even further, it provides such a slope determination system, wherein such at least one substantially rigid frame is about 36 inches long.

In accordance with another preferred embodiment hereof, this invention provides a slope determination system for determining a slope of an element, comprising in combination: at least one substantially rigid frame; wherein such at least one substantially rigid frame comprises, at least one substantially flat surface adapted to abut the element having the slope to be determined, at least one inclinometer held in fixed relationship with such at least one substantially flat surface, and at least one grip assister adapted to assist a user in gripping such at least one substantially rigid frame; wherein such at least one grip assister comprises at least one aperture through such at least one substantially rigid frame, and wherein such at least one aperture is adapted to pass at least one portion of a hand of the user.

In accordance with another preferred embodiment hereof, this invention provides an inclinometer calibrated to measure slope comprising at least one representation of at least one roof to indicate that the inclinometer is calibrated for measuring roof slope.

BRIEF DESCRIPTION OF THE DRAWINGS

FIG. 3 illustrates a front-facing elevation view of the slope determination tool according to a preferred embodiment of the present invention.

FIG. 4 illustrates a side view of the slope determination tool of FIG. 3.

FIG. 5 illustrates a close-up view of the indicator gauge of the slope determination tool of FIG. 2 illustrating a calibrated scale according to a preferred embodiment of the present invention.

FIG. 6 illustrates a sectional view through section 6—6 of FIG. 3.

FIG. 6A illustrates a sectional view through section 6—6 of FIG. 3 illustrating an alternate embodiment of the indicator gauge of FIG. 6.

FIG. 7 illustrates a front-facing view, partially in section, of the slope determination tool and rotatable indicator gauge according to another preferred embodiment of the present invention.

FIG. 8 illustrates a sectional view through section 8—8 of FIG. 7.

FIG. 9 illustrates a front-facing perspective view of the slope determination tool utilizing a laser pointer according to another preferred embodiment of the present invention.

FIG. 10 illustrates a partial sectional detail view, as viewed through the longitudinal centerline of the slope determination tool laser pointer of FIG. 9.

DETAILED DESCRIPTION OF THE BEST MODE AND PREFERRED EMBODIMENTS OF THE INVENTION

Figure 1:
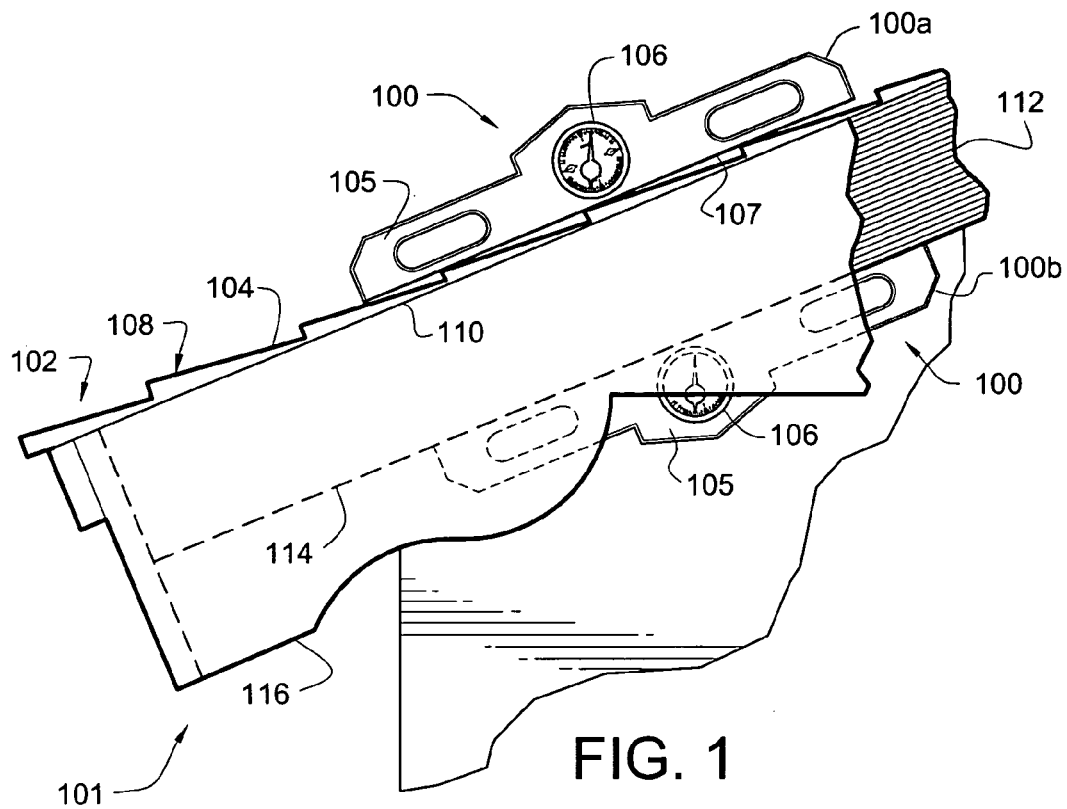
FIG. 1 illustrates a front-facing elevation view illustrating multiple uses of the slope determination tool of the slope determination system according to a preferred embodiment of the present invention.

FIG. 1 illustrates a front-facing elevation view illustrating multiple uses of the slope determination tool 100 of the slope determination system 101 according to a preferred embodiment of the present invention. FIG. 1 illustrates two typical examples using the slope determination tool 100 of the slope determination system 101 positioned to take field measurements of the slope of roof 102, according to a preferred embodiment of the present invention. Preferably, slope determination tool 100 comprises a single linear frame 105

(embodying herein at least one substantially rigid frame) having one essentially flat face 107 along one side, and a circular-shaped indicator gauge 106 adapted to provide two simultaneous readings of a slope, as shown. Preferably, the slope determination tool 100 is fully functional in a three hundred and sixty degrees range of slope positions, including the upright position 100*a*, and inverted position 10*b*, as shown. In the first example of FIG. 1, the slope determination tool 100 is depicted resting on the upper surface 108 of roof 102 in upright position 100*a*. Roof 102 is shown sheathed with shingles 104 having a tapered cross sectional profile (common in shingles made from wood or stone). The preferred extended length of face 107 permits slope determination tool 100 to simultaneously rest over a number of shingles 104, thereby preferably permitting slope determination tool 100 to closely conform to the slope of the underlying substrate, as shown.

In the second example of FIG. 1, the improved functionality of slope determination tool 100 is demonstrated by a slope measurement taken along the underside 114 of roof member 112, while slope determination tool 100 is in inverted position 10*b*. Preferably, in most instances, slope determination tool 100 permits the user to observe a reading of slope while indicator gauge 106 is in a partially obscured position, as shown. As illustrated in the second example of FIG. 1, irregular decorative shaping prevents a direct measurement of roof slope to be taken from fascia member 116. Slope determination tool 100 is shown behind fascia 116 positioned along the underside 114 of an underlying roof member 112. Although fascia 116 covers and therefore obscures the upper portion of indicator gauge 106, a reading of slope is possible using the visible lower portion of indicator gauge 106, as shown (embodying herein wherein, by using such abutting means to abut the element, the slope of the element may be determined by observing at least one of the at least two simultaneous indications of such multiple-indicator means).

Figure 2:
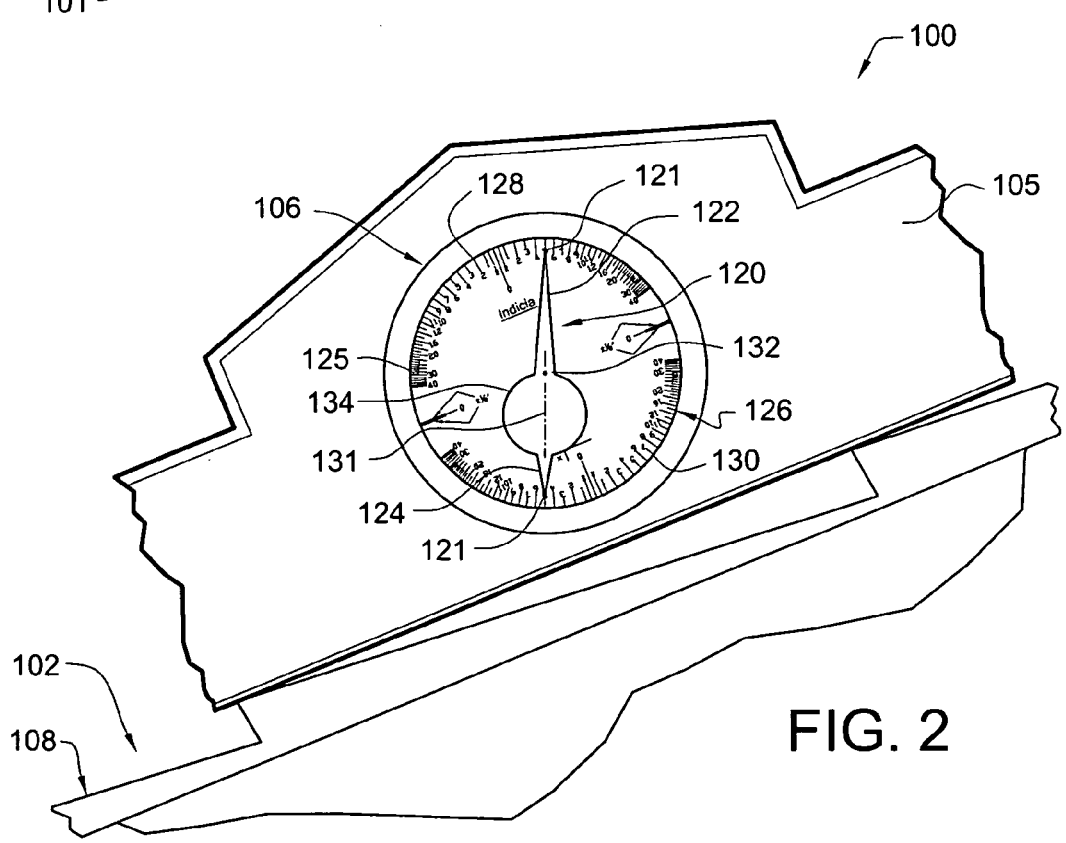
FIG. 2 illustrates a close-up view of the indicator gauge of the slope determination tool according to the preferred embodiment of FIG. 1.

FIG. 2 illustrates a close-up view of the indicator gauge 106 of the slope determination tool 100 according to the preferred embodiment of FIG. 1. Preferably, indicator gauge 106 comprises indicator 120 and one or more calibrated scale(s) 126, as shown (embodying herein calibrated indicia means for providing a calibrated indication of slope, and further embodying herein calibrated indicia to provide a calibrated indication of slope). Preferably, indicator 120 is pivotally-mounted on indicator gauge 106 at pivot axis 132, as shown. Preferably, indicator 120 comprises two pointer portions, first pointer portion 122 and second pointer portion 124, as shown (embodying herein such at least one multiple-indicator comprises pointer portions comprising first pointer portions and second pointer portions).

Preferably, first pointer portion 122 and second pointer portion 124 are arranged in opposing orientation, as shown. As shown in FIG. 2, first pointer portion 122 and second pointer portion 124 preferably share a common longitudinal axis 131 (embodying herein wherein one such first pointer portion and one such second pointer portion are located along a longitudinal axis). In a preferred embodiment of FIG. 2, pivot axis 132 is preferably located transverse to the longitudinal axis 131, approximately midway between the tip end(s) 121 of first pointer portion 122 and second pointer portion 124, as shown (embodying herein wherein such at least one axle crosses transversely along at least one point along the longitudinal axis). Indicator 120 preferably further comprises one or more counterweight portion(s) 134, preferably arranged off-center of pivot axis 132 such that first pointer portion 122 and second pointer portion 124 remain in an essentially constant vertical position by natural gravity action, as shown (embodying herein gravity-assisted positioner means for maintaining, essentially by gravity, the position of such multiple-indicator means with respect to vertical, and embodying herein at least one gravity-assisted positioner to maintain, essentially by gravity, the position of such at least one multiple-indicator with respect to vertical, and further embodying herein wherein such at least one gravity-assisted positioner comprises at least one weight having a center of gravity; and such at least one weight is coupled to such multiple-pointer such that the center of gravity of such at least one gravity-assisted positioner is not located on such at least one axle). Preferably, counterweight portion 134 comprises an integral, preferably circular-shaped, enlargement of second pointer portion 124, as shown. Upon reading the teachings of this specification those of skill in the art will understand that, under appropriate circumstances, such as cost and ease of fabricating, etc., other methods of providing a weight bias to indicator 120, such as adhered weights, inset weights, using different denser materials, etc., may suffice. Preferably, indicator 120 is constructed of a rigid moldable plastic, as shown. Upon reading this specification, those of skill in the art will understand that under appropriate circumstances, such as durability, cost, user preference, etc., other materials for indicator 120, such as metal, wood, etc., may suffice. This highly preferred double-pointer configuration permits the pointer portions of indicator 120 to provide two simultaneous readings of slope by observing the alignments of first pointer portion 122 and a second pointer portion 124 relative to the markings 125 of calibrated scale 126, as shown (embodying herein multiple-indicator means for providing at least two simultaneous indications with respect to such calibrated indicia means, and further embodying herein at least one multiple-indicator to provide at least two simultaneous indications with respect to such calibrated indicia).

Preferably, calibrated scale 126 comprises first scale 128 and an identical second scale 130, as shown (embodying herein wherein such calibrated indicia comprises at least one first calibrated scale and at least one second calibrated scale; and such at least one first calibrated scale and such at least one second calibrated scale are substantially similar in calibration). Preferably, first scale 128 and second scale 130 designate a slope defined by a distance of rise (in inches or fraction of inches) over twelve inches of run, as shown. Upon reading this specification those of skill in the art will understand that under appropriate circumstances, such as convenience, preferred application, etc., other calibrated scales and combinations of scales, such as scales in alternate units of measure, etc., may suffice (embodying herein wherein such at least one first calibrated scale and such at least one second calibrated scale are calibrated differently). Preferably, first scale 128 and second scale 130 are located near the outer circumference of indicator gauge 106, preferably positioned one-hundred eighty degrees apart such that indicator 120, while in use, provides two simultaneous and identical readings of slope, as shown. In the example of FIG. 2, slope determination tool 100 is again shown resting on the upper surface 108 of roof 102. First pointer portion 122 is shown aligned with first scale 128 to indicate a slope of five-inches over a twelve-inch run. Similarly, second pointer portion 124 is shown aligned with second scale 130 to provide an identical and simultaneous slope reading of five-inches of rise over twelve-inches of run. It thus can be appreciated that slope determination tool 100 provides an efficient arrangement for obtaining two identical and simultaneous readings of a single slope, using a single instrument.

FIG. 3 illustrates a front-facing elevation view of the slope determination tool 100 according to a preferred embodiment of the present invention. Preferably, slope determination tool 100 comprises a linear, essentially rectangular frame 105, preferably having an overall length A of about twenty-four inches, and preferably having a height C of about two-and-one-half inches, as shown. Preferably, a first side 136 of frame 105 comprises an essentially flat face 107 to permit slope determination tool 100 to be aligned with an element to be measured, as shown (herein embodying abutting means for abutting the element having the slope to be determined, and embodying herein at least one abutter structured and arranged to abut the element having the slope to be determined, and further embodying herein wherein such at least one abutter comprises at least one essentially flat side of such at least one substantially rigid frame). Preferably, frame 105 comprises a second side 138 having a roof-shaped portion 140, as shown. Roof-shaped portion 140 is preferably adapted to aid the user in distinguishing the function of slope determination tool 100, as shown (embodying herein an inclinometer calibrated to measure slope comprising at least one representation of at least one roof to indicate that the inclinometer is calibrated for measuring roof slope). Upon reading this specification those of skill in the art will understand that under appropriate circumstances, such as consumer preference, cultural iconography, etc., other methods of distinguishing the function of slope determination tool 100, such as pictorial depictions, written indicia, etc., may suffice. In the preferred embodiment of FIG. 3, roof-shaped portion 140 preferably has a width B of six-inches and height J at peak 142 (as measured from face 107) of four-and-one-half inches, as shown. Two roof end portions 144 preferably extend distance H of three-quarters of an inch from second side 138 to complete the profile, as shown. Each end 146 of frame 105 preferably comprises a one-inch chamfered corner 147, preferably located opposite face 107, as shown.

Additionally, frame 105 preferably comprises two gripping apertures 148 adapted to assist a user in gripping frame 105 during transport and use. Preferably, gripping aperture 148 comprises an elongated opening having two circular ends 150, each circular end 150 having a preferred radius R1 of five-eighths of an inch, as shown. Preferably, the width W of gripping aperture 148 is four inches to accommodate the passage of a human hand, as shown (embodying herein wherein such at least one substantially rigid frame comprises at least one grip assister adapted to assist a user in gripping such system and wherein; such at least one grip assister comprises at least one aperture through such at least one substantially rigid frame; and such at least one aperture is adapted to pass at least one portion of a hand of the user). Preferably, to assist user comfort during gripping, all perimeter edges 151 are machined to provide a small radius or chamfer, as shown.

Frame 105 preferably further comprises indicator gauge 106, preferably fixed within frame 105 midway between end(s) 146, as shown. Preferably, calibrated scale 126 of indicator gauge 106 is calibrated to face 107 such that both are held in a constant geometric relationship by frame 105, as shown (embodying herein geometry-control means for controlling the geometry of such calibrated indicia means relative to such abutting means, and further embodying herein at least one geometry-controller). Upon reading this specification those of skill in the art will understand that under appropriate circumstances, indicator gauge 106 may be adapted to freely rotate within frame 105 while indicator 120 is held in a constant geometric relationship with face 107. Frame 105 preferably holds indicator gauge 106 in a constant fixed relationship with face 107, as shown (embodying herein at least one inclinometer held in fixed relationship with such at least one substantially flat surface).

FIG. 4 illustrates a side view of the slope determination tool 100 of FIG. 3. Preferably, the slope determination tool 100 comprises a relatively thin, essentially rectilinear profile to facilitate portability and ease of storage, as shown. Preferably, the slope determination tool 100 comprises a constant cross-sectional thickness along its length of about three-quarters-inch, as shown. Further, the rectilinear profile, in combination with the relative flatness of face 107, preferably permits slope determination tool 100 to be stable and self-supporting in field use, as shown. Upon reading this specification those of skill in the art will understand that under appropriate circumstances, such as materials, cost, preferred use, etc., other profiles, such as square, triangular, etc., may suffice. Preferably, face 107 comprises a continuous rigid metal angle 123 (embodying herein wherein such at least one abutter further comprises a angled rigid metal bar), preferably aluminum, preferably adapted to provide a flat and durable surface along the entire length of face 107, as shown. Preferably, angle 123 comprises a horizontal leg approximately matching the width of face 107, as shown. Preferably, angle 123 is mechanically fastened to frame 105 with a vertical leg of angle 123 oriented on the side opposite indicator gauge 106, as shown. Preferably, to assist user comfort during use, all perimeter edges 151 are machined to provide a small radius or chamfer, as shown.

Reference is now made to FIG. 5 with continued reference to the above-described figures. FIG. 5 illustrates a close-up view of the indicator gauge 106 of the slope determination tool 100 of FIG. 2 illustrating a calibrated scale 126 according to a preferred embodiment of the present invention. Preferably, calibrated scale 126 comprises two principal scales, a first scale 128 and an essentially identical second scale 130, as shown. Preferably, first scale 128 and second scale 130 are arcuate in arrangement, having a center radius point at pivot axis 132, as shown. First scale 128 and second scale 130 are preferably located near the outer circumference 152 of indicator gauge 106 to permit interaction with tip end(s) 121 of indicator 120, as shown (see FIG. 2). Preferably, the zero line(s) 154 (indicating level) of first scale 128 and second scale 130 are positioned exactly one-hundred-eighty degrees apart and are both perpendicular to face 107, as shown. Preferably, first scale 128 and second scale 130 designate a slope defined by a distance of rise (in inches or fraction of inches) over twelve-inches of run, as shown. Preferably, both first scale 128 and second scale 130 provide readings of up to at least forty-inches of rise per foot of run on each side of zero line 154, as shown. Upon reading this specification those of skill in the art will understand that under appropriate circumstances, such as cost, intended use, intended user, etc., other scale ranges, such as continuous scales, scales having lesser ranges, scales having greater ranges, alternate dimensional formats, etc., may suffice.

Preferably, calibrated scale 126 comprises two secondary scales, preferably third scale 156 and an essentially-identical fourth scale 158, as shown. Preferably, the zero line(s) 160 (embodying herein wherein such calibrated indicia further comprises at least one calibrated scale defining at least one position of verticality) of third scale 156 and fourth scale 158 are positioned exactly one-hundred-eighty degrees apart and are both parallel to face 107, as shown. Third scale 156 and fourth scale 158 preferably provide readings of one-eighth inch of run per twelve-inches of rise on each side of zero line(s) 160, as shown. Upon reading this specification those of skill in the art will understand that under appropriate circumstances, considering such issues as cost and intended use, calibrated scale 126 may be rotatable to bring zero line(s) 160 perpendicular with face 107, thereby permitting third scale 156 and fourth scale 158 to determine a slope of one-eighth inch of rise per twelve-inches of run.

Calibrated scale 126 preferably includes identifying and explanatory indicia to assist the user in operating slope determination tool 100, as shown. For example, calibrated scale 126 preferably includes slope/pitch marking 162 to assist the user in identifying the function of slope determination tool 100, as shown.

Preferably, calibrated scale 126 is a dial made from rigid printable plastic. Upon reading this specification those of skill in the art will understand that under appropriate circumstances, such as cost, durability, etc., other materials, such as metal, wood, laminate, paper, etc., may suffice for calibrated scale 126. Preferably, markings 125 are printed on the surface of calibrated scale 126 using a silk-screen process, as shown. Upon reading this specification those of skill in the art will understand that under appropriate circumstances, such as cost, durability, intended use, etc., other methods of marking calibrated scale 126, such as etching, integral-raised molding, printing, etc., may suffice.

FIG. 6 illustrates a sectional view through section 6—6 of FIG. 3. FIG. 6 illustrates the preferred features of a preferred indicator gauge 106. Preferably, indicator gauge 106 comprises a circular cavity 164, preferably recessed into frame 105, as shown (embodying herein wherein such at least one substantially rigid frame further comprises at least one cavity adapted to contain such at least one multiple-indicator and such at least one viewable display of calibrated indicia). Preferably, calibrated scale 126 is firmly attached to the back portion 166 of cavity 164, preferably by bonding, as shown. Under appropriate circumstances, calibrated scale 126 may be printed, etched, or molded directly onto back portion 166 of cavity 164. Preferably, indicator 120 is pivotally mounted to frame 105 using axle 168 located at pivot axis 132, as shown. Preferably, axle 168 comprises a metal pin, as shown. Preferably, axle 168 passes through indicator 120 and calibrated scale 126 and is firmly retained on frame 105, as shown (embodying herein wherein such at least one substantially rigid frame comprises at least one axle, and further embodying herein wherein such first pointer portions and such second pointer portions are pivotally-mounted to such at least one substantially rigid frame on such at least one axle). An integral spacer 170 preferably engages over axle 168, as shown, to position indicator 120 away from calibrated scale 126, to prevent, for example, accidental frictional contact between indicator 120 and calibrated scale 126. Upon reading this specification those of skill in the art will understand that under appropriate circumstances, such as cost, ease of manufacturing, etc., other methods of suspending indicator 120 within indicator gauge 106, such as an axle formed integrally with calibrated scale 126, etc., may suffice.

Preferably, a fixed cover 172, preferably transparent, preferably constructed of glass, most preferably constructed of plastic, protects cavity 164, as shown (embodying herein at least one protective cover for protectively covering such at least one cavity; wherein such at least one protective cover is substantially transparent). Cover 172 is preferably recessed into frame 105 to maintain a flush finish on the exterior of slope determination tool 100, as shown. Preferably, cover 172 is permanently sealed to frame 105. More preferably, cover 172 is removable to permit replacement of indicator 120, cover 172, and/or calibrated scale 126, as shown.

Preferably, frame 105 is made from a rigid and durable material, such as plastic, wood, steel or aluminum. Most preferably, frame 105 is made from moldable plastic, as shown. Upon reading this specification those of skill in the art will understand that under appropriate circumstances, such as cost, intended use, etc., other materials, such as carbon, fiber, mixed combinations of the above-mentioned materials, etc., may suffice.

FIG. 6A illustrates a sectional view through section 6—6 of FIG. 3 illustrating another embodiment 165 of the indicator gauge 106 of FIG. 6. In embodiment 165, axle 168 is preferably held in place at longitudinal axle ends 167 and 169, wherein longitudinal axle end 167 is firmly attached to frame 105 and longitudinal axle end 169 is firmly attached to cover 172, which is preferably transparent, as shown. Preferably, integral spacer 171 engages over axle 168 to position indicator 120 away from the calibrated scale 126 to assist in free movement of the indicator 120 and deter binding between the indicator 120 and calibrated scale 126, as shown. Other than as herein described for the alternate embodiment 165 of FIG. 6A, the other major components of such embodiment 165 are preferably as described above in FIG. 6.

Upon reading this specification those of skill in the art will understand that under appropriate circumstances, such as economics, preferred materials, intended use, etc., other methods of allowing free movement of the indicator 120, such as bearings, magnets, etc., may suffice.

FIG. 7 illustrates a front-facing view, partially in section of the slope determination tool 100 with a rotatable indicator gauge 178 (embodying herein at least one gravity-assisted positioner comprises a rotatable gauge mounted in such at least one substantially rigid frame) according to another preferred embodiment 173 of the present invention. Preferably, in embodiment 173, the slope determination tool 100 comprises a rotatable indicator gauge 178, as shown. Preferably, the rotatable indicator gauge 178 comprises an internal disc 181 that freely rotates about the fixed axle 168 of the indicator gauge 178, as shown, as did the indicator 120 rotating about the axle 168 as in the previously described gauge 106 above. Preferably, the internal disc 181 comprises a weighted bottom portion 183, preferably heavier than the top portion 185 and arranged such that the internal disc 181 will always indicate a horizontal plane (zero degrees slope) when the indicator gauge 178 is in a perpendicular position (vertical) to the slope determination tool 100 and the slope determination tool 100 is on a flat and horizontally level plane (no slope), as shown.

Preferably, cover 172 comprises a fixed mark 180 indicating a resting point for the indicator gauge 178 such that when a slope is horizontal the internal disc 181 reading on the calibrated indicia 126 is zero degrees, as shown. Upon reading this specification those of skill in the art will understand that under appropriate circumstances, such as cost, readability, intended use, etc., other ways of applying fixed mark 180, such as engraving, painting, etching, etc., may suffice. Most preferably, the fixed mark 180 is permanently etched and colored on cover 172, as shown.

Preferably, in embodiment 173, the slope determination tool 100 further comprises a gauge brake 174 that will hold the internal disc 181 such that, when the gauge brake 174 is engaged, the internal disc 181 will not move from the position it was in when the gauge brake 174 was engaged, as shown (embodying herein wherein such at least one substantially rigid frame comprises a gauge-brake structured and arranged to hold the position of such rotatable gauge by engaging such gauge-brake and release such rotatable gauge by disengaging such gauge-brake). Preferably, the gauge brake 174 assists in determining slope with the slope determination tool 100 when, for example, slope determination tool 100 has to be raised overhead and used when the rotatable indicator gauge 178 cannot be seen. In such usage, the user can set the slope determination tool 100 on the slope and apply the gauge brake 174 until the user can lower the slope determination tool 100 and read the indicator gauge 178. Upon reading this specification those of skill in the art will understand that under appropriate circumstances, such as location of the slope to be determined, visual obstacles blocking the users view of the indicator gauge 178, etc., other types of use, such as from a position under a slope, over a slope, etc., may suffice.

FIG. 8 illustrates a sectional view through section 8—8 of FIG. 7. FIG. 8 further illustrates the embodiment 173 combining the rotatable indicator gauge 178 and gauge brake 174.

Preferably, gauge brake 174 comprises a simple push-button shaft 175 with a return spring 176 and brake-pad assembly 186, as shown. Preferably, an upper portion 187 of the frame 105 comprises an aperture 177, preferably slightly larger than the diameter of the shaft 175 that creates an opening through the upper portion 187 to the indicator gauge 178 through which the push-button shaft 175 may be installed, as shown. Preferably, the aperture 177 further comprises a recessed inner end 195, preferably recessed such that the brake-pad tip will sit flush into the recessed inner end 195 when in a resting state (not depressed), as shown. Preferably, the push-button shaft 175 comprises a metal shaft, preferably having an upper flared flat-button-end 179 and a lower hollow inner-threaded tip, as shown. Preferably, the brake-pad assembly 186 comprises a flared flat-bottom end 197 having an external threaded screw portion 184 that threads into the lower hollow inner-threaded tip of the push-button shaft 175, as shown. Preferably, a brake-pad 199 is attached to the flared flat-bottom end 197, as shown.

The described gauge brake 174 assembly assists in installing the gauge brake 174 as the shaft may be placed through spring 176 and into aperture 177, after which the brake-pad assembly 186 may be threaded onto the shaft 175, as shown. In such manner the gauge brake 174 will not fall out of the aperture 177 and the spring will provide enough room for the brake-pad 199 to move onto the indicator gauge 178 when depressed and to return into the recessed inner end 195 when in a resting state (not depressed). Upon reading this specification those of skill in the art will understand that under appropriate circumstances, such as economics, ease of manufacturing, etc., other methods of manufacturing and assembling the brake-pad assembly 186, such as unitary forming of parts, adhesive attaching, other styles of push-buttons, etc., may suffice.

Upon reading this specification those of skill in the art will understand that under appropriate circumstances, such as cost, manufacturing efficiency, accommodation for left-handedness, ease of use, etc., other arrangements of gauge brake 174, such as different shapes, styles, sizes, placements and/or different materials, such as high-density plastics, carbon-fiber, wood, metals, etc., may suffice.

FIG. 9 illustrates a front-facing perspective view of the slope determination tool 100 utilizing a laser pointer 190 (embodying herein wherein such at least one abutter comprises at least one laser pointer) according to another preferred embodiment 210 of the present invention. Preferably, laser pointer 190 provides a visual indicator to assist a user in determining a slope at a distant point, as shown. For example, when given at least two points 189 (such as might be found if used on a building slab/foundation herein illustrated as axis X) and point 192 (such as may be located along a vertical wall herein illustrated as axis Y), the slope determination tool 100 preferably utilizes laser pointer 190 to determine the slope between the two points 189 and 192, as shown. Preferably, this is accomplished by placing one end 212 of the flat planar "level" portion 214 of the slope determination tool 100 on point 189 (axis X) and then aiming the laser pointer 190 at the other point 192 (along axis Y), such that a user can then read the subsequent slope on the indicator gauge 106, as shown.

Furthermore, when given at least one end-point and a desired slope, the slope determination tool 100 utilizing laser pointer 190 may be used to determine a second end-point given the slope, as shown. Preferably, by placing one end 212 of the flat planar "level" portion 214 of the slope determination tool 100 on point 189 and then adjusting the angle α until the indicator gauge 106 indicates the desired slope, the laser pointer 190 may be activated and will be pointing at the point 192 to illustrate where the point 192 would be with that slope, as shown.

Preferably, laser pointer 190 is mounted onto frame 105 near one gripping aperture 148 such that actuator button 191 can be easily depressed by a user's finger 194, as shown. Preferably, when actuated, laser pointer 190 will emit laser beam 193 that is parallel to and aligned with the flat planar "level" portion 214 of first side 136, thereby marking a precise point 192 on axis Y, as shown (embodying herein wherein such at least one essentially flat side of such at least one substantially rigid frame comprises at least one laser pointer structured and arranged to visually extend at least one longitudinal axis of such at least one essentially flat side). Preferably, laser pointer 190 is removable and/or serviceable. Upon reading this specification those of skill in the art will understand that under appropriate circumstances, such as cost, manufacturing efficiency, accommodation for left-handedness, ease of use, etc., other arrangements of laser pointer 190, such as different shapes, styles, sizes, placements, etc., may suffice.

Figure 11:
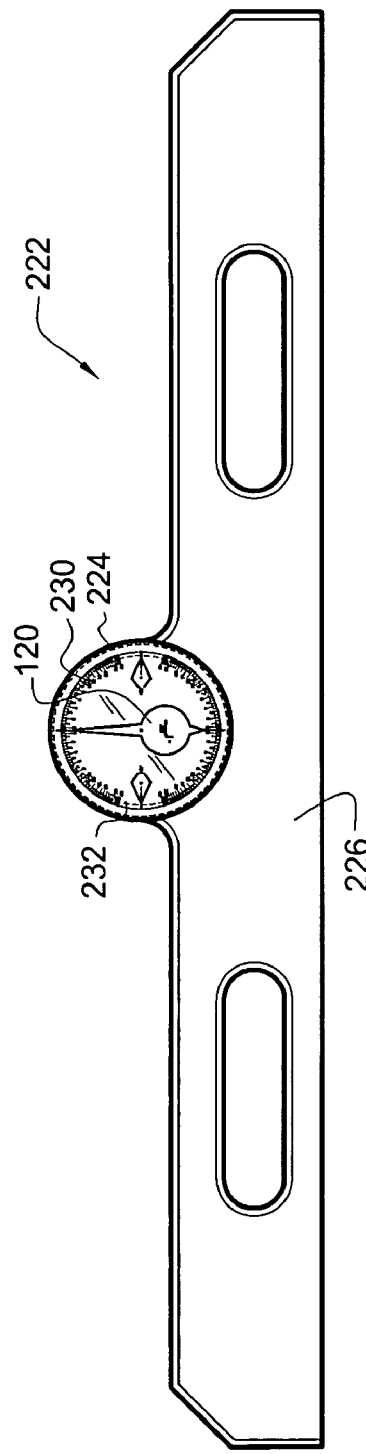
FIG. 11 illustrates a front view of another preferred embodiment of a slope determination tool comprising a top-readable gauge according to another preferred embodiment of the present invention.
Figure 13:
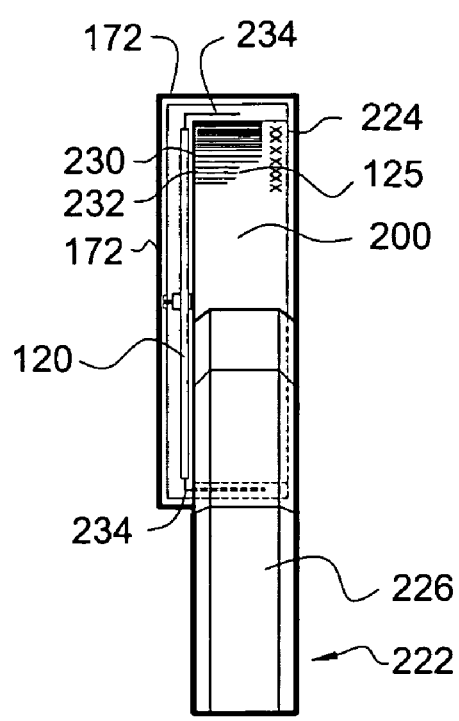
FIG. 13 illustrates a side view of the slope determination tool of FIG. 11.

FIG. 10 illustrates a partial sectional detail view as viewed through the longitudinal centerline of the slope determination tool laser pointer of FIG. 9. Preferably, the laser pointer 190 is secured to frame 105 by setscrews 196 as shown, allowing the laser 198 to be adjusted or removed, for example, to replace the entire unit or batteries. Upon reading this specification those of skill in the art will understand that under appropriate circumstances, such as cost, manufacturing efficiency, accommodation for commonly available lasers 198, ease of use, etc., other arrangements of laser pointer 190, such as different shapes, styles, sizes, ways of securing, placements, etc., may suffice. Preferably, laser beam 193 is parallel to, and aligned with, the flat planar "level" portion 214, as shown. Preferably, a finger-actuator button 191 controls laser 198 such that, when actuator button 191 is depressed, a laser beam 193 is emitted from laser 198, as shown. Upon reading this specification those of skill in the art will understand that under appropriate circumstances, such as cost, manufacturing efficiency, accommodation for left-handedness, ease of use, etc., other control arrangements of actuator button 191 such as different shapes, styles, sizes, placements, etc., may suffice. FIG. 11 illustrates a front view of another preferred embodiment of a slope determination tool 222 comprising a top-readable gauge 224 according to another preferred embodiment of the present invention. FIG. 13 illustrates a side view of the slope determination tool 222 of FIG. 11. Preferably, slope determination tool 244 utilizes a frame 226 that holds top-readable gauge 224, as shown. Top-view is understood to mean that a user looking downward onto the slope determination tool 222 can read the calibrated scale 230. Most preferably, top-view is further understood to mean that any portion of the entire viewable peripheral arc 200 of top-readable gauge 224 may be read (embodying herein wherein at least one of such first pointer portion is viewable from a position above such calibrated indicia), preferably, approximately one-hundred-eighty degrees being viewable by a user. Upon reading this specification those of skill in the art will understand that under appropriate circumstances, such as cost, manufacturing efficiency, accommodation for left-handedness, ease of use, etc., other top view arrangements, such as different shapes, styles, sizes, materials, etc., may suffice. Preferably, any portion of markings 232 along the viewable arc 200 is viewable by a user through cover 171, as shown.

Preferably, the top-readable gauge 224 further comprises dual pointers 234 that extend over the calibrated scale 230, as shown. Preferably, the pointers 234 are comprised of 24-gauge or smaller metal wire and are shaped to wrap around the calibrated scale 230, so that at least a portion of indicator 120 is also top-readable, as shown. Upon reading this specification those of skill in the art will understand that under appropriate circumstances, such as cost, manufacturing efficiency, ease of use, etc., other arrangements of pointer 234, such as different shapes, styles, sizes, materials, etc., may suffice.

Figure 12:
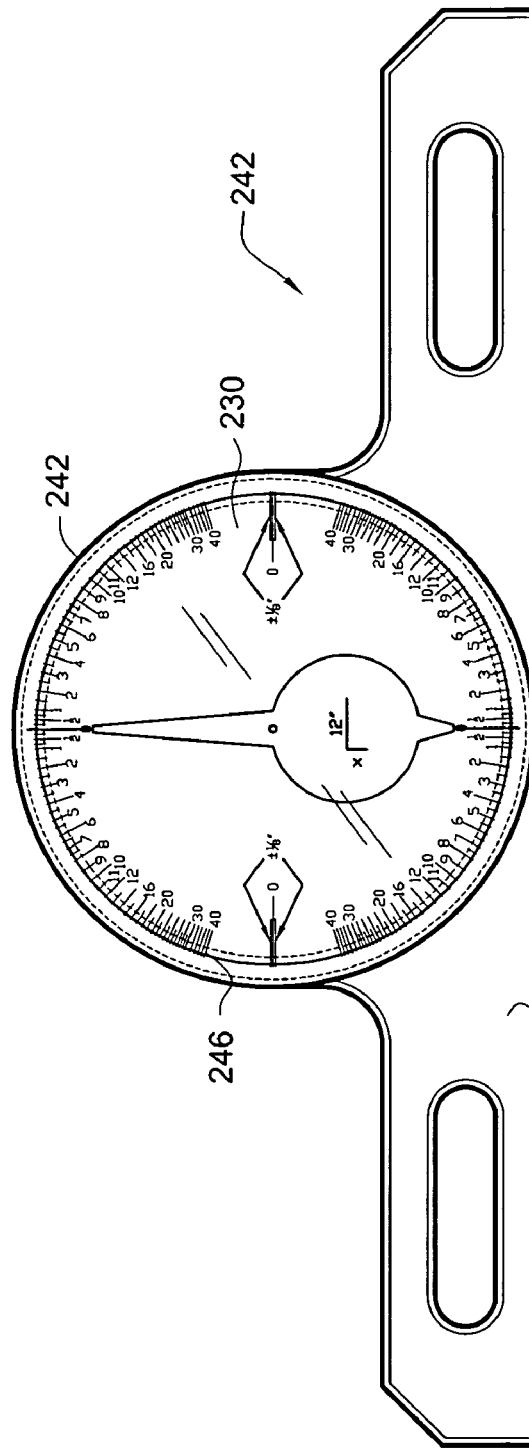
FIG. 12 illustrates a front view of an alternate preferred embodiment illustrating the large top-readable gauge.
Figure 14:
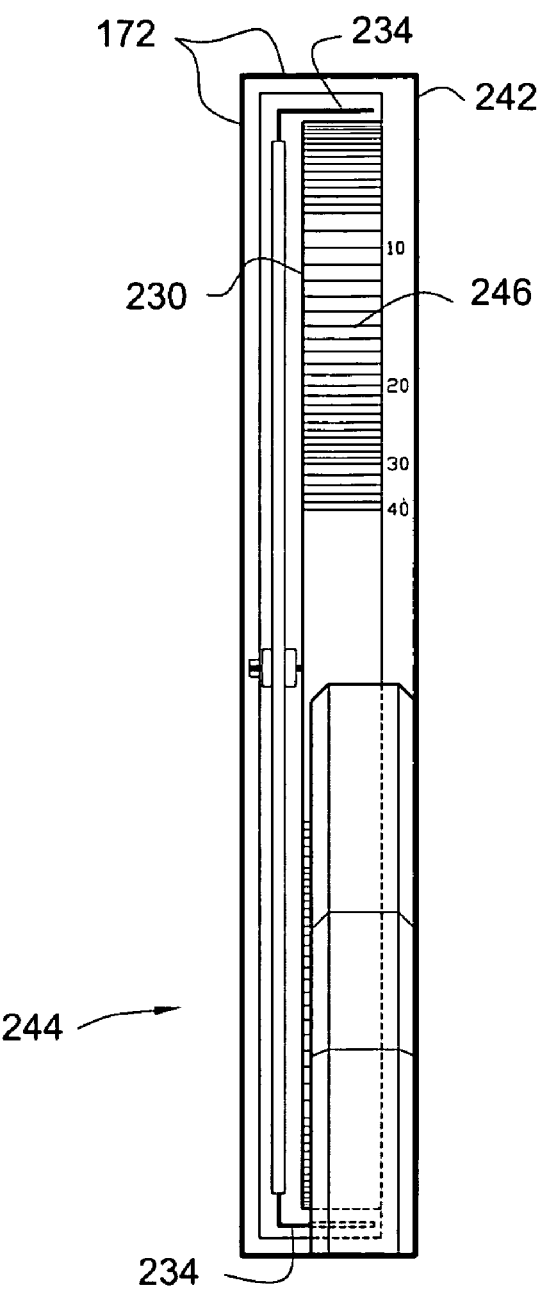
FIG. 14 illustrates a side view of the slope determination tool of FIG. 12.

FIG. 12 illustrates a front view of an alternate preferred embodiment illustrating a large top-readable gauge 242. FIG. 14 is a side view of the slope determination tool 244 of FIG. 12. Preferably, slope determination tool 244 comprises a very large top-readable gauge 242, preferably comprising more increments of measure, greater accuracy, and larger markings 246 than slope determination tool 222 to allow for more precise determinations of slope, as shown. Upon reading this specification those of skill in the art will understand that under appropriate circumstances, such as cost, manufacturing efficiency, ease of use, etc., other arrangements of large gauge 242, such as different shapes, styles, sizes, markings 125, etc., may suffice.

It is noted that the slope determination tool 244 comprises similarities to slope determination tool 222 in that both embodiments comprise a top-readable gauge and may be used to determine slope, as shown.

Figure 15:
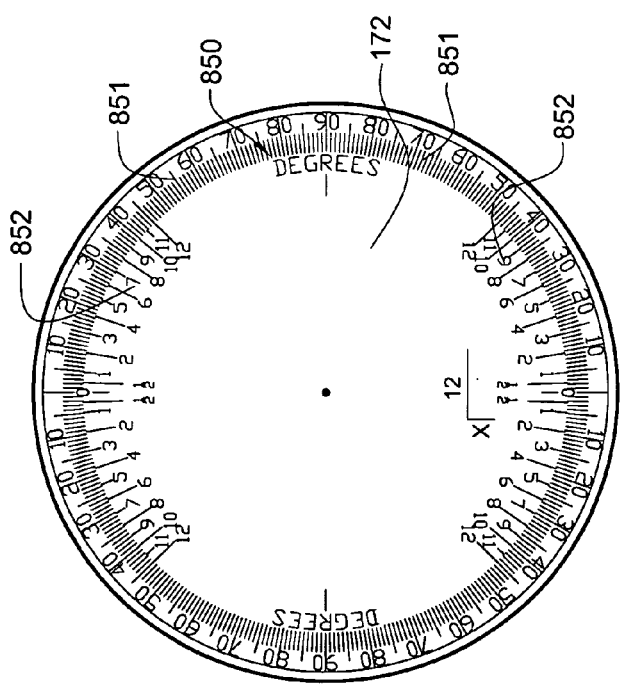
FIG. 15 illustrates a close-up view of an alternate indicator gauge of the slope determination tool of FIG. 2 illustrating a different calibrated scale according to a preferred embodiment of the present invention.

FIG. 15 illustrates a close-up view of an alternate calibrated scale 850 for the slope determination tool of FIG. 2. Preferably, calibrated scale 850 indicates slope in degrees on outer scale 851, and rise (in inches) over 12 inches of run on inner scale 852, as shown. Preferably, calibrated scale 850 is printed, etched, or molded onto indicator gauge 106 or cover 172, as shown. Preferably, calibrated scale 850 is removable and replaceable.

Figure 16:
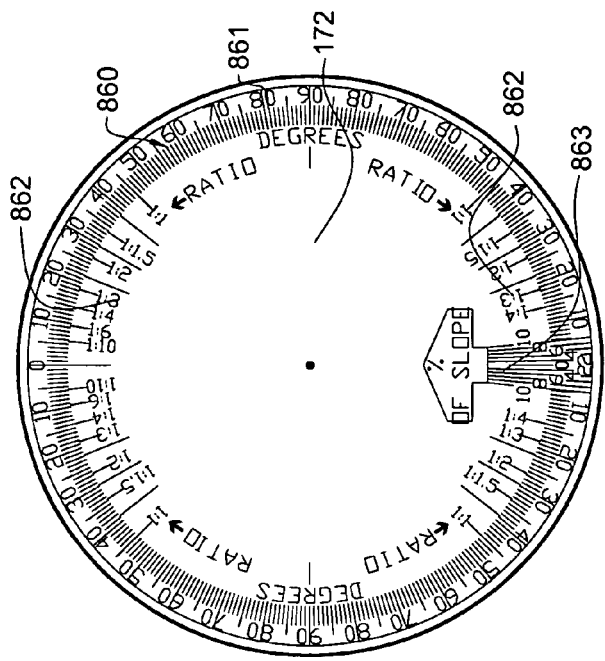
FIG. 16 illustrates a close-up view of an alternate indicator gauge of the slope determination tool of FIG. 2 illustrating a different calibrated scale according to a preferred embodiment of the present invention.

FIG. 16 illustrates a close-up view of an alternate calibrated scale 860 for the slope determination tool of FIG. 2. Preferably, calibrated scale 860 indicates slope in degrees on outer scale 861, and ratio of rise to run on inner scale 862, and percent of slope on inset scale 863. Preferably, calibrated scale 860 is printed, etched, or molded onto indicator gauge 106 or cover 172, as shown. Preferably, calibrated scale 860 is removable and replaceable.

Figure 17:
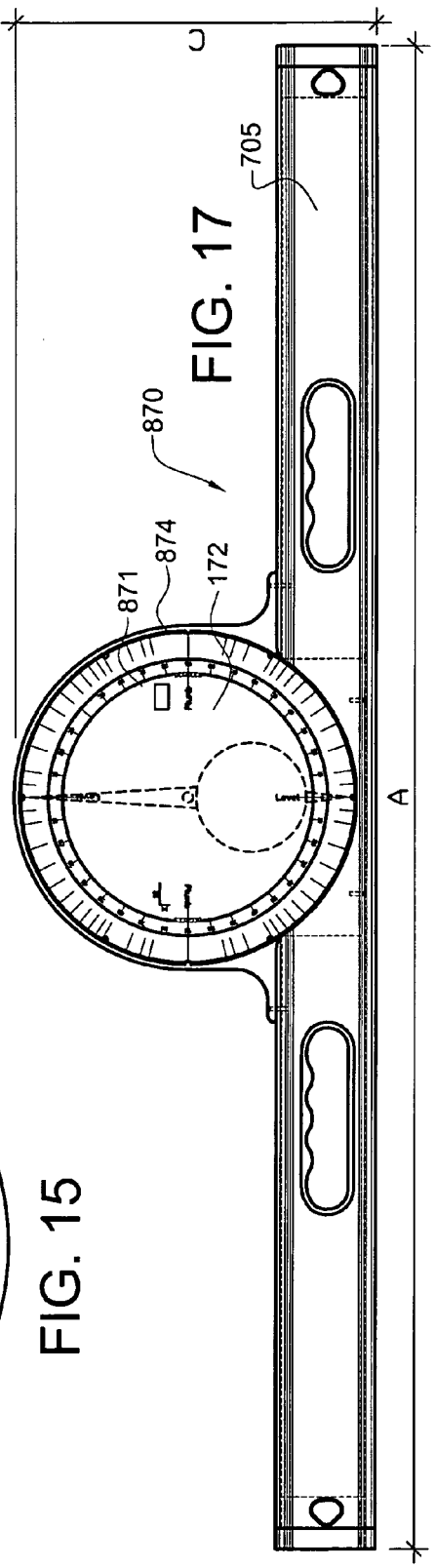
FIG. 17 illustrates a front-facing elevation view of the slope determination tool according to another preferred embodiment of the present invention.

FIG. 17 illustrates a front-facing elevation view of the slope determination tool according to another preferred embodiment of the present invention. Preferably, slope determination tool 870 comprises a linear, essentially rectangular frame 705, preferably having an overall length A of at least about thirty-six inches, and preferably having a height C of at least about eight-and-one-half inches, as shown. Preferably, frame 705 is metal, preferably aluminum, as shown. By increasing the size of at least one of the radius of circular cavity 874, the radius of calibrated scale 871, and the overall length A, greater accuracy is achieved, as shown. The inventor has determined that when calibrated scale 871 is preferably at least about eight inches in diameter and length A is preferably at least about 36 inches, an accuracy of at least one half of one degree is achieved, as shown. This high degree of accuracy is especially useful to professional contractors and building inspectors. Preferably, this high degree of accuracy permits slope determination tool 870 to be used as a plumb line and as a level, as shown. Other than as herein described for the alternate embodiment 870 of FIG. 17, the other major components of such embodiment 870 are preferably as described above in FIG. 6.

Figure 18:
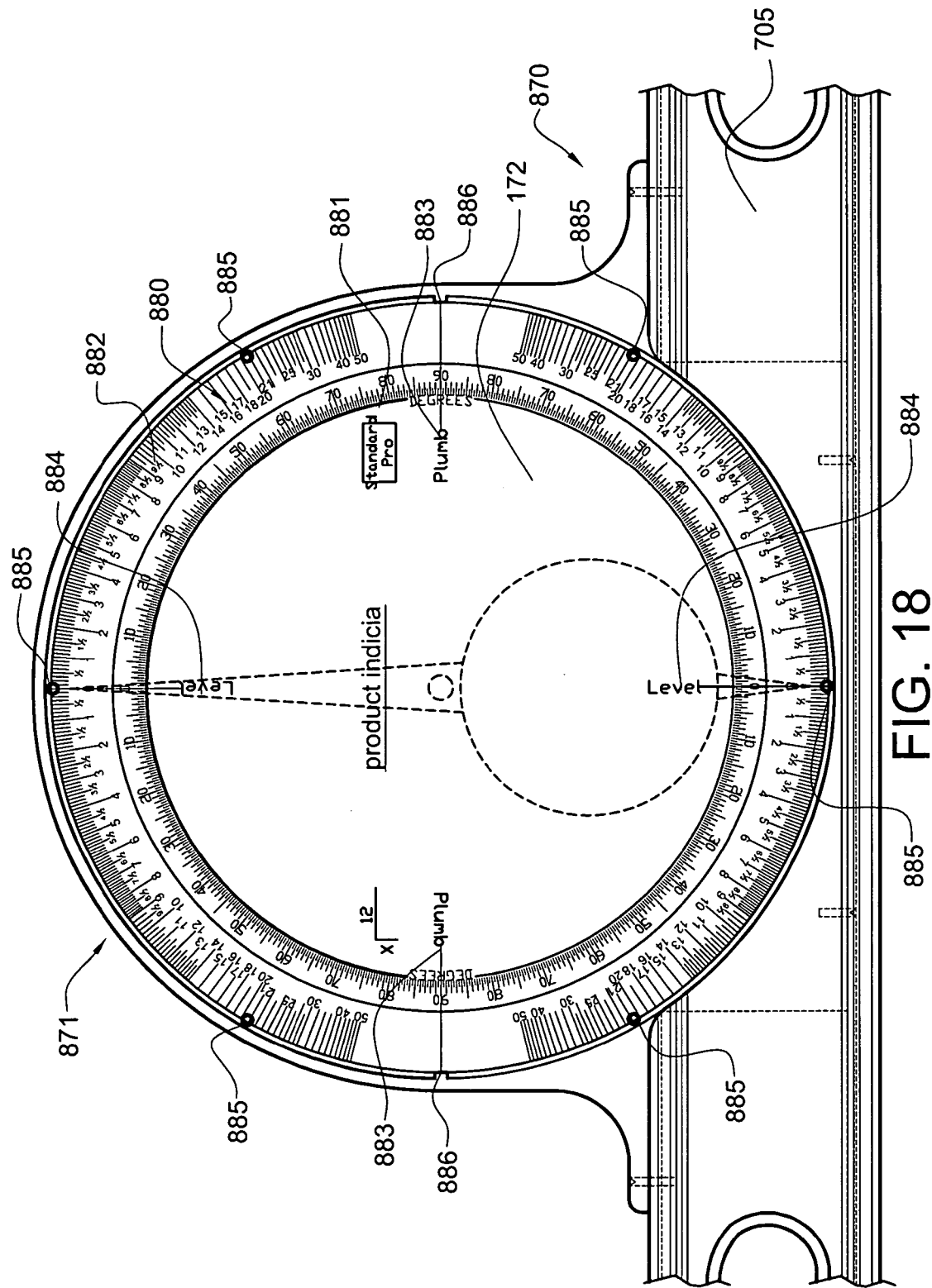
FIG. 18 illustrates a close-up view of the indicator gauge of the slope determination tool of FIG. 17 illustrating a calibrated scale according to a preferred embodiment of the present invention.

FIG. 18 illustrates a close-up view of the indicator gauge of the slope determination tool 870 of FIG. 17 illustrating a calibrated scale 871 according to a preferred embodiment of the present invention. Calibrated scale 871 preferably indicates slope in degrees on inner scale 881, rise over twelve-inches of run on outer scale 882, plumb on inset scale 883, and level on inset scale 884, as shown. Preferably, calibrated scale 871 may be printed, etched, or molded onto indicator gauge 106 or, most preferably, onto cover 172, as shown. Preferably, calibrated scale 871 is removable and replaceable, as shown. Cover 172, preferably having calibrated scale 871, is preferably attached to frame 705 with set-screws 885, as shown. Cover 172 is preferably properly aligned with frame 705 by alignment grooves 886 and set-screws 885, as shown. Cover 172, having calibrated scale 871, is preferably easily removed and replaced by removing and replacing set-screws 885. Upon reading this specification those of ordinary skill in the art will understand that under appropriate circumstances, such as cost, ease of manufacturing, etc., other means of accurately aligning and securing cover 172, such as clips, friction, screw-on covers, etc., may suffice.

Figure 19:
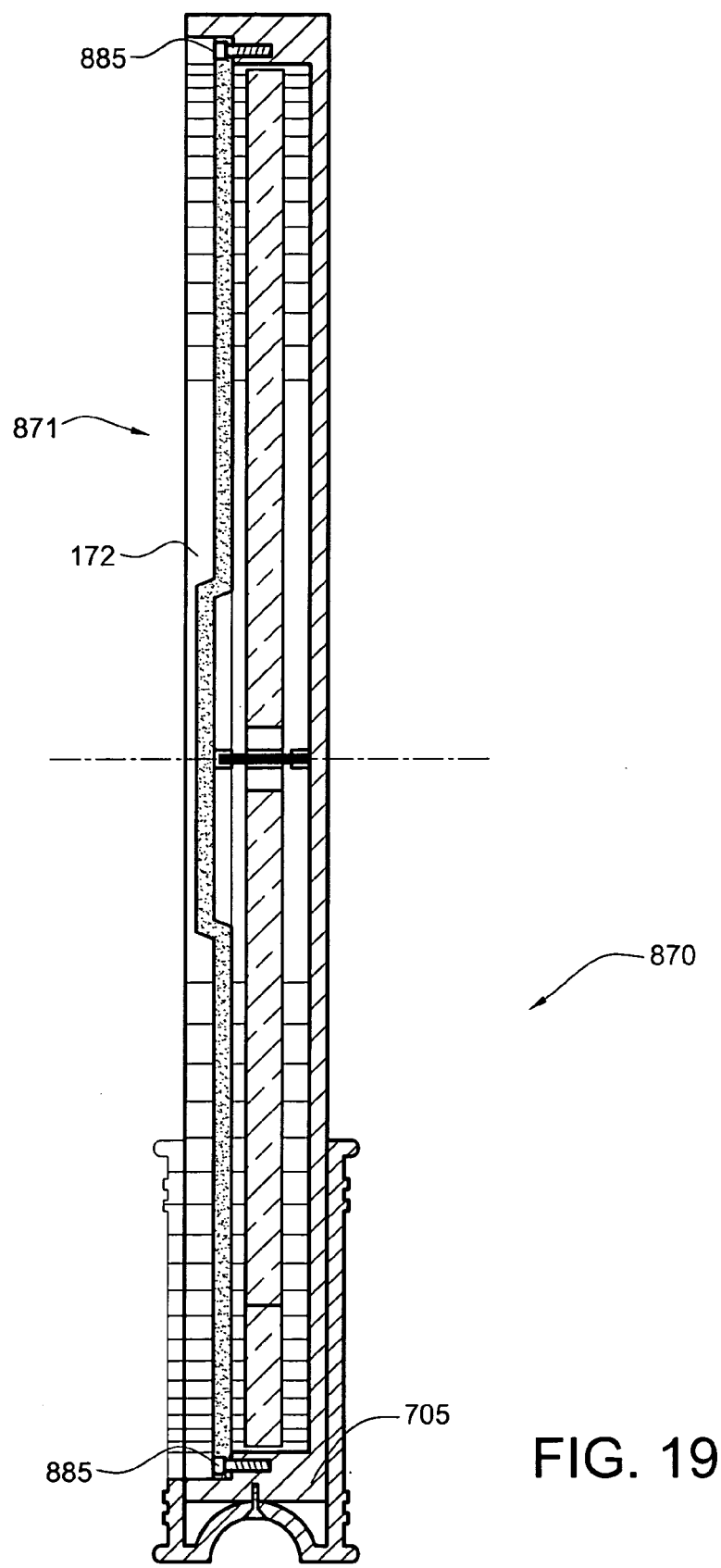
FIG. 19 illustrates a sectional view through section 19—19 of FIG. 17.

FIG. 19 illustrates a sectional view through section 19—19 of FIG. 17. FIG. 17 details how set-screws 885 preferably attach cover 172, preferably having calibrated scale 871, to frame 705, as shown.

Figure 20:
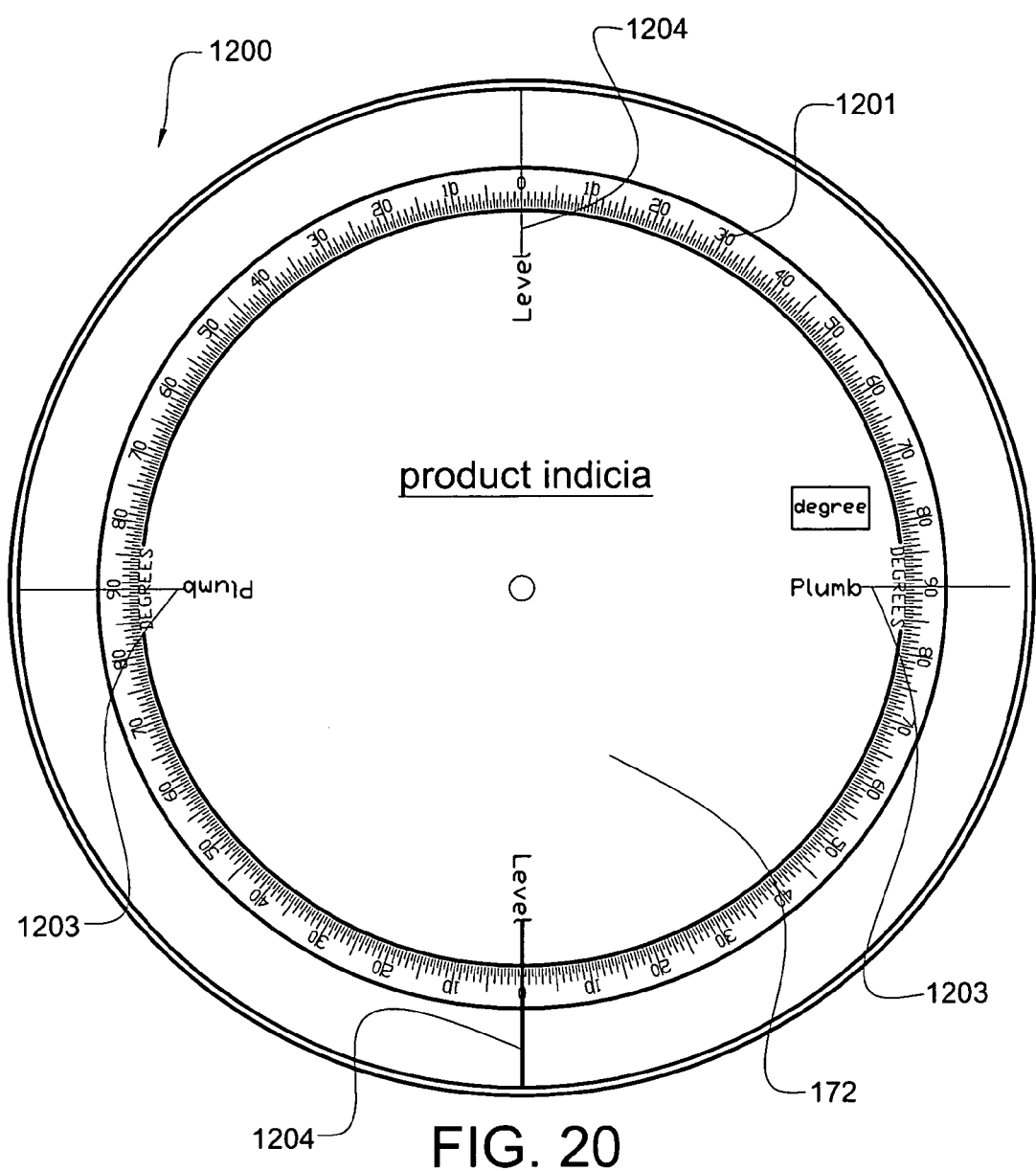
FIG. 20 illustrates a close-up view of an alternate indicator gauge of the slope determination tool of FIG. 17 illustrating a different calibrated scale according to a preferred embodiment of the present invention.

FIG. 20 illustrates a close-up view of an alternate indicator gauge of the slope determination tool of FIG. 17 illustrating a different calibrated scale 1200 according to a preferred embodiment of the present invention. Calibrated scale 1200, which is preferably sized to fit the eight-inch cover 172 of embodiment 870, preferably indicates slope in degrees on outer scale 1201, plumb on inset scale 1203, and level on inset scale 1204, as shown. Calibrated scale 1200 is preferably printed, etched, or molded onto indicator gauge 106, or, most preferably, replaceable cover 172, as shown.

Figure 21:
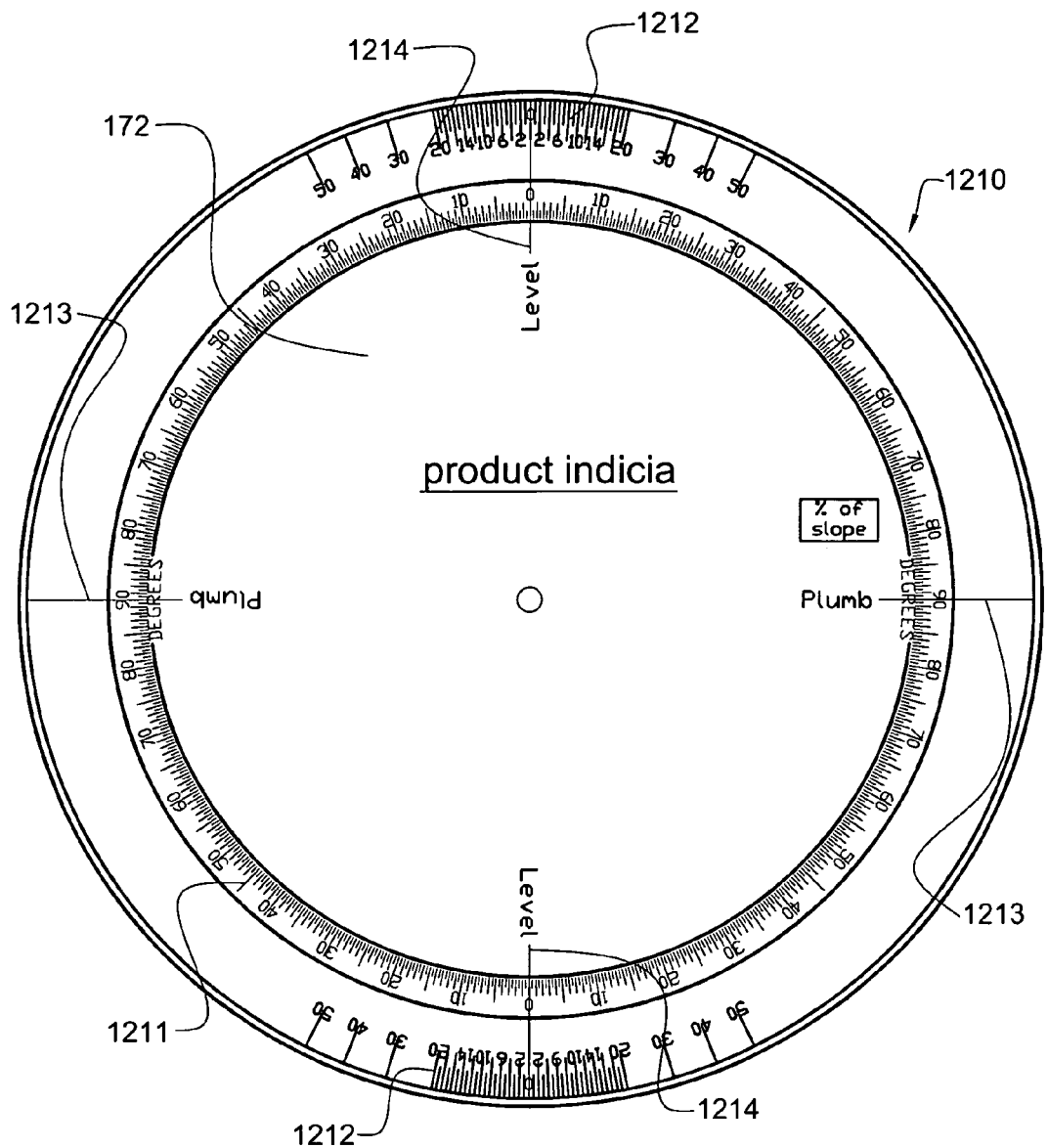
FIG. 21 illustrates a close-up view of an alternate indicator gauge of the slope determination tool of FIG. 17 illustrating a different calibrated scale according to a preferred embodiment of the present invention.

FIG. 21 illustrates a close-up view of an alternate indicator gauge of the slope determination tool of FIG. 17 illustrating a different calibrated scale 1210 according to a preferred embodiment of the present invention. Calibrated scale 1210, which is preferably sized to fit the eight-inch cover 172 of embodiment 870, preferably indicates slope in degrees on inner scale 1211, percent of slope on outside scale 1212, plumb on inset scale 1213, and level on inset scale 1214, as shown. Calibrated scale 1210 is preferably printed, etched, or molded onto indicator gauge 106, or, most preferably, replaceable cover 172, as shown.

Under appropriate circumstances, an assortment of replaceable covers 172 with various calibrated scales 106 may be available to users.

Upon reading this specification those of skill in the art will understand that under appropriate circumstances, such as intended use, local units of measure, user preference, etc., other calibrated scales, having other combinations and types of scales, may suffice.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A slope determination system, for determining a slope of an element, comprising in combination:
   a) calibrated indicia means for providing a calibrated indication of slope;
   b) multiple-indicator means for providing at least two simultaneous indications with respect to said calibrated indicia means;
   c) gravity-assisted positioner means for maintaining, essentially by gravity, the position of said multiple-indicator means with respect to vertical;
   d) abutting means for abutting the element having the slope to be determined; and
   e) geometry-control means for controlling the geometry of said calibrated indicia means relative to said abutting means;
   f) wherein said geometry-control means comprises protective cover means for protectively covering said multiple-indicator means;
   g) wherein said protective cover means comprises visual access mean for permitting visual access to said multiple-indicator means;
   h) wherein said protective cover means comprises said calibrated indicia means;
   i) wherein said calibrated indicia means designates at least one slope defined by a measure of vertical rise over a measure of horizontal run; and
   j) wherein, by using said abutting means to abut the element, the slope of the element may be determined by observing at least one of the at least two simultaneous indications of said multiple-indicator means.

2. A slope determination system, for determining a slope of an element, comprising in combination:
   a) calibrated indicia adapted to provide a calibrated indication of slope;
   b) at least one multiple-indicator, having at least one first pointer portion and at least one second pointer portion, to provide at least two simultaneous indications with respect to said calibrated indicia;
   c) at least one gravity-assisted positioner to maintain, essentially by gravity, the position of said at least one multiple-indicator with respect to vertical;
   d) at least one abutter structured and arranged to abut the element having the slope to be determined; and
   e) at least one geometry-controller to control the geometry of said calibrated indicia relative to said at least one abutter;
   f) wherein said at least one geometry-controller comprises at least one protective cover adapted to protectively cover said at least one multiple-indicator;
   g) wherein said at least one protective cover comprises at least one transparent portion to permit visual access to said at least one multiple-indicator;
   h) wherein said at least one protective cover comprises said calibrated indicia;
   i) wherein said calibrated indicia designates at least one slope defined by a measure of vertical rise over a measure of horizontal run; and
   j) wherein, by using said at least one abutter to abut the element, the slope of the element may be determined by observing at least one of the at least two simultaneous indications of said at least one multiple-indicator.

3. The slope determination system, according to claim 2, wherein:
   a) said calibrated indicia comprise at least one first calibrated scale and at least one second calibrated scale;
   b) said at least one first calibrated scale and said at least one second calibrated scale are substantially similar in calibration; and
   c) said calibrated indicia are structured and arranged such that said first pointer portion provides at least one such indication (of such at least two indications) with respect to said at least one first calibrated scale, and said second pointer portion provides at least one simultaneous such indication with respect to said at least one second calibrated scale.

4. The slope determination system, according to claim 3, wherein each of said at least one two calibrated scales is between about two and about twelve inches in diameter.

5. The slope determination system, according to claim 3, wherein at least one scale portion of said at least one first calibrated scale is viewable from a position above said slope determination system.

6. The slope determination system, according to claim 3, wherein at least one portion of said at least one calibrated scale is printed on at least one rigid frame.

7. The slope determination system, according to claim 3, wherein at least one portion of said at least one calibrated scale is printed on at least one replaceable dial.

8. The slope determination system, according to claim 3, wherein said at least one protective cover comprises at least one substantially transparent material.

9. The slope determination system, according to claim 3, wherein said at least one protective cover is replaceable.

10. The slope determination system, according to claim 3, wherein said calibrated indicia designates at least one slope defined by at least one rise over at least one run.

11. The slope determination system, according to claim 10, wherein said calibrated indicia designates at least one slope defined by at least one distance of rise in inches over a run of twelve-inches.

12. The slope determination system, according to claim 11, wherein said calibrated indicia further designates at least one slope having a run of one-eighth-inch and a rise of twelve-inches.

13. The slope determination system, according to claim 3, wherein said calibrated indicia further designates at least one slope defined by angular degrees.

14. The slope determination system, according to claim 3, wherein said calibrated indicia further designates at least one slope defined by percent of slope.

15. The slope determination system, according to claim 3, wherein said calibrated indicia further comprise at least one calibrated scale defining at least one position of verticality.

16. The slope determination system, according to claim 3, wherein said calibrated indicia further comprise at least one calibrated scale defining at least one position of plumb.

17. The slope determination system, according to claim 3, wherein said calibrated indicia further comprise at least one calibrated scale defining at least one position of level.

18. The slope determination system, according to claim 2, wherein:
   a) said calibrated indicia comprise at least one first calibrated scale and at least one second calibrated scale;
   b) said at least one first calibrated scale and said at least one second calibrated scale are calibrated differently; and
   c) said calibrated indicia is structured and arranged such that said first pointer portion provides such at least one indication with respect to said at least one first calibrated scale, and said second pointer portion provides such at least one simultaneous indication with respect to said at least one second calibrated scale.

19. The slope determination system, according to claim 2, wherein:
   a) said at least one substantially rigid frame comprises at least one axle;
   b) said at least one multiple-indicator comprises pointer portions comprising first pointer portions and second pointer portions; and
   c) said first pointer portions and said second pointer portions are pivotally-mounted with respect to said at least one substantially rigid frame on said at least one axle.

20. The slope determination system, according to claim 19, wherein:
   a) one said first pointer portion and one said second pointer portion are located along a longitudinal axis of said multiple-indicator; and
   b) said at least one axle crosses transversely along at least one point along such longitudinal axis.

21. The slope determination system, according to claim 19, wherein said at least one first pointer portion is viewable from a position above said slope determination system.

22. The slope determination system, according to claim 2, wherein:
   a) said at least one gravity-assisted positioner comprises at least one weight having a center of gravity; and
   b) said at least one weight is coupled to said multiple-indicator such that the center of gravity of said at least one gravity-assisted positioner is not located on said at least one axle.

23. The slope determination system, according to claim 2, wherein said at least one gravity-assisted positioner comprises at least one rotatable gauge comprising at least one rotatable scale mounted in said at least one substantially rigid frame.

24. The slope determination system, according to claim 23, wherein said at least one substantially rigid frame comprises at least one gauge-brake structured and arranged to hold the position of said at least one rotatable gauge by engaging said at least one gauge-brake and to release said at least one rotatable gauge by disengaging said at least one gauge-brake.

25. The slope determination system, according to claim 2, wherein said at least one abutter comprises at least one laser pointer.

26. The slope determination system, according to claim 2, wherein said at least one geometry controller comprises at least one substantially rigid frame.

27. The slope determination system, according to claim 26, wherein said at least one abutter comprises at least one essentially flat side of said at least one substantially rigid frame.

28. The slope determination system, according to claim 27, wherein said at least one abutter further comprises at least one angled rigid metal bar.

29. The slope determination system, according to claim 27, wherein said at least one abutter has a length of about 24 inches.

30. The slope determination system, according to claim 27, wherein said at least one abutter comprises at least one laser pointer structured and arranged to visually extend at least one longitudinal axis of said at least one abutter.

31. The slope determination system, according to claim 26, wherein said at least one substantially rigid frame further comprises at least one cavity adapted to contain said at least one multiple-indicator and said calibrated indicia.

32. The slope determination system, according to claim 31, wherein said at least one substantially rigid frame comprises plastic.

33. The slope determination system, according to claim 31, wherein said at least one substantially rigid frame comprises metal.

34. The slope determination system, according to claim 31, wherein said at least one protective cover is substantially transparent.

35. The slope determination system, according to claim 34, wherein said at least one protective cover comprises at least one first calibrated scale and at least one second calibrated scale.

36. The slope determination system, according to claim 34, wherein said at least one protective cover is replaceable by a user.

37. The slope determination system, according to claim 31, wherein said at least one cavity is between about two and about twelve inches in diameter.

38. The slope determination system, according to claim 26, wherein said at least one substantially rigid frame comprises at least one grip assister adapted to assist a user in gripping said system.

39. The slope determination system, according to claim 38, wherein:
   a) said at least one grip assister comprises at least one aperture through said at least one substantially rigid frame; and
   b) said at least one aperture is adapted to pass at least one portion of a hand of the user.

40. The slope determination system, according to claim 26, wherein said at least one substantially rigid frame is about 24 inches long.

41. The slope determination system, according to claim 26, wherein said at least one substantially rigid frame is about 36 inches long.

* * * * *